Feb. 15, 1966 H. BÄHRING 3,235,767

RASTER SIZE CONTROL WITH CONSTANT ASPECT RATIO

Filed March 4, 1963

Jnventor:
Herbert Bahring
By:
Michael S. Striker
ATTORNEY 3,235,767

RASTER SIZE CONTROL WITH CONSTANT ASPECT RATIO

Herbert Bähring, Darmstadt, Germany, assignor to Fernseh G.m.b.H., Darmstadt, Germany Filed Mar. 4, 1963, Ser. No. 262,617
Claims priority, application Germany, Mar. 3, 1962, F 36,182
5 Claims. (Cl. 315—27)

The present invention concerns a horizontal and vertical beam deflection control arrangement of a television receiver.

In a known circuit arrangement for producing a steadily varying amplitude control in the output circuit of an inductively loaded horizontal scan output transformer one end of the two deflector coils is connected with the tap of a cylindrical coil which is connected with two points of the output transformer. A steady variation of the horizontal deflection amplitude is effected by axially shifting a ferrite core within the coil over a distance equal to one-half of the length of the coil. If the two coil units are properly dimensioned the result is that the resulting primary inductivity of the output transformer and consequently the high voltage and the focus of the cathode ray tube remain constant.

It is also known to derive the charging voltage for the vertical beam deflector arrangement from the booster voltage of the horizontal scan sawtooth current generator. Variations of the booster voltage influence is an equal manner the horizontal and vertical sweep amplitudes. However in these known circuit arrangements it is not possible to effect simultaneously with a stepless variation of the horizontal deflection amplitude also a proportional variation of the vertical deflection amplitude while maintaining the focus and the high voltage constant because up to now a constant high voltage depended upon a constant booster voltage, i.e., without variation of the vertical deflection amplitude.

It is therefore one object of this invention to provide a deflection control arrangement which reconciles the above two contradictory demands and which makes it possible to vary by adjustment of one single variable control element simultaneously the horizontal and vertical deflection amplitudes while maintaining a predetermined ratio therebetween and maintaining the high voltage and the focus unchanged.

It is another object of this invention to provide an arrangement as set forth which is extremely simple in structure and highly effective in operation.

With the above objects in view the invention includes in the horizontal and vertical beam deflection control arrangement of a television receiver, a horizontal scan sawtooth voltage output transformer including variable inductivity means for simultaneously varying the horizontal and vertical beam deflection amplitudes while maintaining a predetermined ratio therebetween.

Figure 1A:
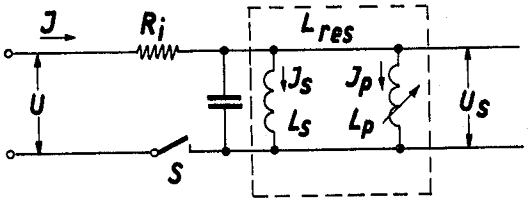
Figure 1B:
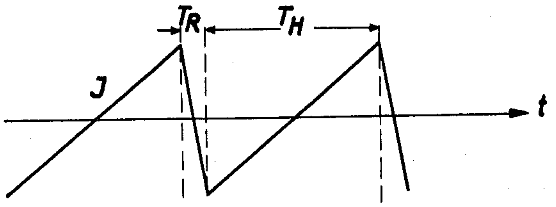
Figure 2:
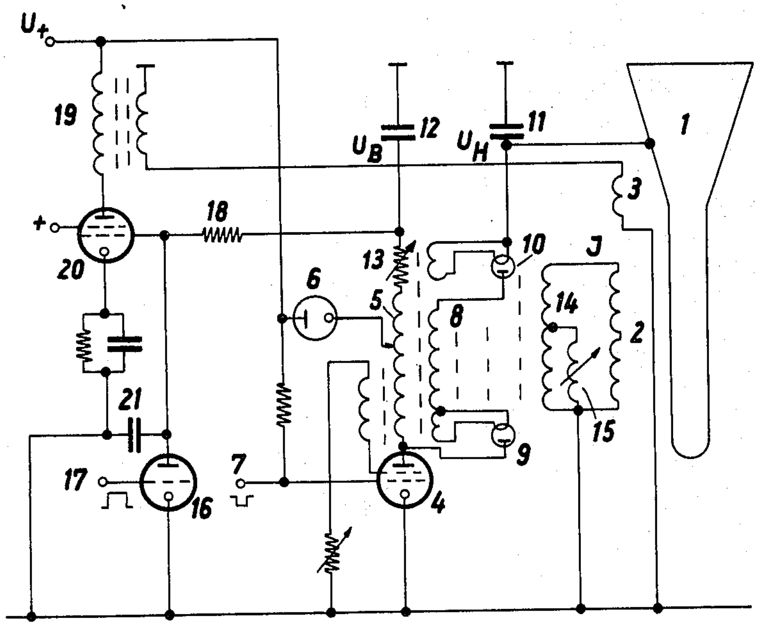

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1*a* is a simplified diagram illustrating the output stage of a sawtooth generator;

FIG. 1*b* is a diagram illustrating the wave form of a current flowing through the arrangement according to FIG. 1*a*; and FIG. 2 is a schematic circuit diagram of an arrangement according to the invention.

Before describing a circuit arrangement according to the invention it will be explained how the above mentioned desired result is obtained. It is obtainable because the high voltage, the magnitude of which depends upon the inductivity $L_{res}$ which is the primary side inductivity of the transformers and upon the variation of current with time $$\frac{di}{dt_R}$$

during the retrace, i.e., $$U_R = L_{res} \cdot \frac{di}{dt_R}$$

is maintained at a constant value which is possible if both $L_{res}$ and $$\frac{di}{dt_R}$$

are varied simultaneously proportionally to each other in opposite sense. Up to now both these values have been kept constant.

The above condition is met by providing a variable inductivity in parallel with the deflector coils or with at least a portion of a winding of the output transformer, and by dimensioning the sawtooth pulse time constant of the arrangement which is determined by the resulting input inductivity and the resulting input resistance of the arrangement, in such a manner that the magnetic energy $1/2 L_{res} I^2$ stored by the inductivity is the same in at least two settings of the amplitude regulator. This can be achieved for instance by connecting an adjustable or selectable resistor in series with the primary winding of the output transformer.

The following calculation referring FIGS. 1*a* and 1*b* will prove that the desired result can be achieved in the above described manner, namely that the current flow in the deflection coils can be changed steplessly, that its variation is proportional to a variation of the booster voltage and that the high voltage produced simultaneously remains constant.

In FIG. 1*a* U indicates the input voltage, $L_{res}$ indicates the inductivity of the line scan generator, S represents the control tube having a switching action, $R_i$ is the ohmic internal resistance of the generator, and $L_p$ is the variable inductivity by means of which the deflector current in the inductivity $L_s$ is to be varied. The inductivity $L_s$ is the inductivity of the secondary winding of the transformer which is transformed to the primary winding.

FIG. 1*b* illustrates the current J flowing through the arrangement. $L_s$ and $L_p$ constitute together the resulting inductivity $$L_{res} = \frac{L_p \cdot L_s}{L_p + L_s}$$

The maximum value of this resulting inductivity will be designated L, and its minimum value will be designated L*, i.e., $$L = \frac{L_s}{1 + \frac{L_s}{L_p}}$$

and $$L^* = \frac{L_s}{1 + \frac{L_s}{L_p^*}}$$

Moreover it is to be understood that $$L^* = \frac{1}{m} L$$

wherein $m$ is larger than 1. Accordingly the maximum value of $J = I$, and the maximum value of $J_s = I_s$, while the minimum value $J=I^*$ and the minimum value of $J_s=I_s{}^*$; the corresponding voltages are $U_s$ and $U_s{}^*$. During the trace stroke of time $T_H$ the following voltages appear at the inductivity $L_{res}$:

$$U_{sH}=L\cdot\frac{I}{T_H}$$

$$U_{sH}{}^*=\frac{L^*\cdot I^*}{T_H{}^*}$$

Out of either one of these maximum and minimium voltages the booster voltage is derived.

During the retrace period $T_R$ the following voltages appear at the inductive $L_{res}$:

$$U_{sR}=L\cdot\frac{I}{T_R}U_{sR}{}^*=\frac{L^*\cdot I^*}{T_R}$$

From these maximum and minimum voltages the high voltage for the cathode ray tube is derived.

The retrace time period $T_R$ is determined in the horizontal deflection control system in question by an oscillation of the resonant circuit LC, and $T_R$ is equal to $\pi\sqrt{LC}$. Through LC, the resonant circuit is characterized such that it is formed from the inductance L and the summed capacitances of the transformers and the load circuits whereby these magnitudes appear in the equivalent inputs to the transformers. Since C is constant this means that $$T_R{}^*=\frac{1}{\sqrt{m}}T_R$$

while $$T_H{}^*\approx T_H$$

If the magnetic energy $$\frac{LI^2}{2}=\frac{L^*I^{*2}}{2}$$

is constant then $$I^*=I\sqrt{\frac{L}{L^*}}=\sqrt{m}I$$

From this follows:

$$U_{sH}{}^*=\frac{L^*I^*}{T_H{}^*}=\frac{\sqrt{m}}{m}\frac{LI}{T_H}=\frac{1}{\sqrt{m}}U_{sH}$$

and $$U_{sR}{}^*=\frac{L^*I^*}{T_R{}^*}=\frac{\sqrt{m}\cdot\sqrt{m}}{m}\frac{LI}{T_R}=U_{sR}$$

From the current distribution $$J=J_s+J_p$$

and $$\frac{J_p}{J_s}=\frac{L_s}{L_p}$$

it follows:

$$J=J_s\left(1+\frac{L_s}{L_p}\right)$$

$$J_s=\frac{J}{1+\frac{L_s}{L_p}}$$

If again the calculation is continued with the maximum values $I_s$ and I and with the minimum values $I_s{}^*$ and $I^*$ then the following is obtained:

$$I_s{}^*=\frac{I^*}{1+\frac{L}{L_p{}^*}}$$

$$I_s=\frac{I}{\frac{L_s}{L}} \qquad I_s{}^*=\frac{I^*}{\frac{L_s}{L^*}}=\frac{I^*}{\frac{L_s}{L}m}$$

$$\frac{I_s{}^*}{I_s}=\frac{I^*}{mI}=\frac{\sqrt{m}1}{mI}=\frac{1}{\sqrt{m}}$$

It can be seen from the above that the demand that $$\frac{I_{s*}}{I_s}$$

be equal to $$\frac{U_{sH}{}^*}{U_{sH}}$$

when $$U_{sR}{}^*=U_{sR}$$

is complied with. Now it is only necessary to show that it is also possible to comply with the condition that the magnetic energy $$\frac{L\cdot J^2}{2}$$

be equal in both cases of inductivity regulation.

$$L=\frac{L_s}{1+\frac{L_s}{L_p}}$$

and $$L^*=\frac{L_s}{1+\frac{L_s}{L_p{}^*}}$$

In view of the above it can be stated that the function $I^*=f(I)$ must be located between the values $I^*=mI$ and $I^*=I$ which are associated with the two extreme conditions while $U_s$ and J are both constant (internal resistance of the control circuit being $R_1\to\infty$). The resistance $R_1$ thus prevents $I^*$ from becoming equal to $m$I. By suitably dimensioning $R_1$ or, e.g., by arranging a resistor of suitable magnitude in series with the booster capacitor one can achieve that $I^*$ has a value located between the possible limit values so that also $I^*=\sqrt{m}I$ and that the magnetic energy is the same in both extreme positions of the variable inductivity which controls the horizontal deflection amplitude.

Referring now to FIG. 2 the illustrated arrangement comprises a self-excited horizontal scan sawtooth generator including high voltage generation derived from the sawtooth voltage and further comprising a separately excited vertical sawtooth current generator. In FIG. 2 a cathode ray tube or picture tube 1 is shown, the electron beam of which is projected onto the screen of the tube and horizontally deflected by the electromagnetic deflection system 2 and vertically deflected by the electromagnetic deflection system 3. The horizontal deflection sawtooth current is produced by the tube 4, the anode of which is connected via a tap of the primary winding 5 of the sawtooth output transformer and via a booster diode 6 with the source of anode voltage U. The control grid of the tube 4 is supplied via terminal 7 with synchronization impulses. A secondary winding 8 of the output transformer together with the diodes 9 and 10 serve to produce high voltage at the capacitor 11. The primary winding 5 is further connected via resistor 13 (which may be variable) and booster capacitor 12 to ground. The horizontal deflection current is derived from the output transformer by means of the secondary winding 14 and is supplied to the horizontal deflector system or coils 2. In addition a variable inductivity 15 is connected in parallel with a portion of the secondary winding 14 i.e. between the above mentioned tap and one end of the winding 14.

The vertical deflection sawtooth current is produced with the aid of the tubes 16 and 20. The grid of the discharge tube 16 is supplied via terminal 17 with control pulses each of which renders the tube 16 conductive for a brief moment and thus causes discharge of the capacitor 21. This capacitor 21 is charged across resistor 18 by the booster voltage available at the capacitor 12. The resulting sawtooth voltage at the capacitor 21 produces in the tube 20 a sawtooth current which is transmitted by the transformer 19 to the vertical deflector system or coils 3.

It can be seen that in this arrangement in accordance with the invention an adjustment of the variable inductivity 15 causes simultaneously a corresponding variation of the vertical and horizontal deflection amplitudes because both the deflector current J in the circuit leading to the deflector system 2 and also the charge $U_B$ of the capacitor 12 are changed in the same proportion or in the same amount by the variation of the inductivity 15 while the high voltage $U_H$ at the capacitor 11 remains constant. The sawtooth pulse time constant of the sawtooth generator including the tube 4 may be adjusted if desired to a correct value by suitably dimensioning the resistor 13, the value of the anode voltage $U_H$ remaining practically unchanged nevertheless. Experiments carried out with an arrangement as described above have shown that a suitable value for the resistor 13 is 160 ohms. When the inductivity 15 was varied 20%, the size of the image appearing on the screen on the tube 1 changed about 10%. The greatest variation of the high voltage amounted to 0 when the inductivity 15 was adjusted to either one of the extreme values thereof while in a medium adjustment position thereof the variation of the high voltage amounted to about +.5%.

It should be noted that the invention as described is applicable not only to an arrangement comprising a self-excited horizontal deflection sawtooth current generator but applies also to an arrangement with a separately excited sawtooth generator.

It will be understood that each of the elements described above, or two or more together, may also find a useful application in other types of horizontal and vertical beam deflection control arrangements of a television receiver differing from the types described above.

While the invention has been illustrated and described as emboided in a horizontal and vertical beam deflection control arrangement of a television receiver including a variable inductivity, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a circuit arrangement for steplessly regulating the amplitudes in the horizontal and vertical deflection circuit of a television receiver comprising a horizontal sawtooth scan generator for providing a high voltage for the picture tube and means for regaining the reactive power required for the beam deflection through a linearizing diode as a bias voltage for said diode, as a driving voltage for the horizontal sawtooth generator and as charging voltage for the vertical deflection sawtooth generator, in combination, a horizontal scan sawtooth current output transformer having a plurality of windings connected in the horizontal deflection circuit of said television receiver, variable inductance means connected in parallel with one winding of the horizontal scan sawtooth current output transformer, said variable inductance means including varying means for providing variation of the inductance of said variable inductance means between two extreme conditions, and time constant circuit components connected in said horizontal deflection circuit having values selected to provide the same magnetic energy of the inductance of said output transformer at the two extreme conditions of said variable inductance means so that with constant high voltage and picture focus the horizontal sweep amplitude and the vertical deflection amplitude are regulated simultaneously in fixed proportion and by variation of only said one variable inductance.

2. In a circuit arrangement as claimed in claim 1, including a variable ohmic resistance means connected in series with another winding of said sawtooth voltage output transformer, said one winding comprising a secondary winding and said other winding comprising a primary winding of said output transformer.

3. In a circuit arrangement as claimed in claim 1, another primary winding operatively coupled to the vertical deflection circuit of said television receiver, said one winding comprising a secondary winding operatively coupled to the horizontal deflection circuit of said television receiver and said other winding comprising a primary winding of said output transformer, said horizontal and vertical beam deflection amplitudes being maintained at a predetermined ratio at the two extreme conditions of said variable inductance means.

4. In a horizontal and vertical beam deflection control arrangement of a television receiver, in combination, an electromagnetic horizontal beam deflection system; an electromagnetic vertical beam deflection system; first generator means for producing a sawtooth current for controlling the horizontal beam deflection; a horizontal scan sawtooth current output transformer having at least one primary winding and at least one secondary winding, said primary winding being connected with said first generator means for receiving therefrom said sawtooth current, said secondary winding being coupled to said horizontal beam deflection system for supplying the latter with sawtooth current; second generator means for producing a vertical beam deflecting sawtooth current, said second generator means being coupled to said vertical beam deflection system for supplying the latter with sawtooth current; variable inductance means connected in parallel with at least a portion of said secondary winding of said output transformer for varying, by adjustment of said variable inductance means, the current flow in said horizontal beam deflection system, said variable inductance means including varying means for providing variation of the inductance of said variable inductance means between two extreme conditions; and coupling means coupling said second generator means and the primary winding of said output transformer for causing the current flow in said vertical beam deflection system to vary in the same proportion as the current flow in said horizontal beam deflection system varies when said variable inductance means is adjusted, said coupling means having components having values selected to provide the same magnetic energy of the inductance of said output transformer at the two extreme conditions of said variable inductance means so that by adjustment of only said variable inductance means the size of the image on the television screen can be varied while maintaining the ratio between height and width unchanged.

5. In a horizontal and vertical beam deflection control arrangement of a television receiver, in combination, an electromagnetic horizontal beam deflection system; an electromagnetic vertical beam deflection system; first generator means for producing a sawtooth current for controlling the horizontal beam deflection; a horizontal scan sawtooth current output transformer having at least one primary winding and secondary windings, said primary winding being connected with said first generator means for receiving therefrom said sawtooth current, one of said secondary windings being coupled to said horizontal beam deflection system for supplying the latter with sawtooth current, one further secondary winding being coupled to a rectifier for generating high voltage for the picture tube; second generator means for producing a vertical beam deflecting sawtooth current, said second generator means being coupled to said vertical beam deflection system for supplying the latter with sawtooth current; steadily variable inductance means connected in parallel with at least a portion of one secondary winding of said transformer for varying, by adjustment of said variable inductance means, the current flow in said horizontal beam deflection system; coupling means arranged between said second generator system and said primary winding of said transformer for causing the amplitude of the current flow in said vertical beam deflection system to vary in accordance with said current flow in said horizontal beam deflection system in dependence of the adjustment of said variable inductance; and circuit elements connected in series to the primary winding of said horizontal scan transformer for maintaining the magnetic energy stored in the resulting inductivity of said transformer and said horizontal deflection system the same at at least two settings of said variable inductance, so that by adjustment of only said one variable inductance the size of the image on the television screen can be varied while maintaining the ratio between height and width and the high voltage for the picture tube unchanged.

References Cited by the Examiner

UNITED STATES PATENTS

| | | | |
|---|---|---|---|
| 2,449,969 | 9/1948 | Wright | 315—27 |
| 2,510,670 | 6/1950 | Trott | 178—7.7 |
| 2,543,304 | 2/1951 | Schwarz | 315—27 |

DAVID G. REDINBAUGH, *Primary Examiner.*